United States Patent [19]

Akiyama et al.

[11] Patent Number: 5,130,402

[45] Date of Patent: Jul. 14, 1992

[54] COATING COMPOSITION AND PLASTISOL COMPOSITION, AND ARTICLES COATED THEREWITH

[75] Inventors: Hajime Akiyama, Otsu; Shunji Matsunaga, Shiga; Yoshio Taguchi, Shiga; Mitsuo Koseki, Shiga; Takashi Takemoto, Kameoka, all of Japan

[73] Assignee: Sanyo Chemical Industries, Ltd., Kyoto, Japan

[21] Appl. No.: 374,140

[22] Filed: Jun. 30, 1989

[30] Foreign Application Priority Data

| Jul. 1, 1988 | [JP] | Japan | 63-165593 |
| Sep. 9, 1988 | [JP] | Japan | 63-238318 |
| Oct. 11, 1988 | [JP] | Japan | 63-255659 |
| Oct. 11, 1988 | [JP] | Japan | 63-255660 |
| Dec. 27, 1988 | [JP] | Japan | 63-330769 |
| Mar. 7, 1989 | [JP] | Japan | 1-54575 |
| Mar. 15, 1989 | [JP] | Japan | 1-64363 |
| May 10, 1989 | [JP] | Japan | 1-116576 |

[51] Int. Cl.$^5$ ............... C08G 18/80; C08G 18/50; C08G 18/60; C08L 27/06
[52] U.S. Cl. ............... 528/45; 524/101; 524/196; 524/198; 524/199; 525/124
[58] Field of Search ............... 528/45; 524/101, 196, 524/198, 199; 525/124

[56] References Cited

U.S. PATENT DOCUMENTS

| 3,248,371 | 4/1966 | Damusis | 528/45 |
| 3,267,078 | 8/1966 | Damusis | 528/45 |
| 3,621,000 | 11/1971 | Schmelzer | 528/45 |
| 3,770,703 | 11/1973 | Gruber et al. | 528/45 |
| 3,793,417 | 2/1974 | Erikson et al. | 528/49 |
| 4,315,840 | 2/1982 | Kempter et al. | 528/45 |
| 4,420,600 | 12/1983 | Zavisza | 528/60 |
| 4,518,729 | 5/1985 | Breidenbach et al. | 524/101 |
| 4,546,167 | 10/1985 | Chang | 528/64 |
| 4,725,661 | 2/1988 | Miyabayashi | 528/45 |
| 4,761,465 | 8/1988 | Speranza et al. | 528/45 |
| 4,767,836 | 8/1988 | Cuscurida et al. | 528/45 |
| 4,824,925 | 4/1989 | Kamarchik, Jr. et al. | 528/45 |
| 4,841,008 | 6/1989 | Tsukamoto et al. | 528/45 |
| 4,880,891 | 11/1989 | Miyabayashi et al. | 528/45 |
| 4,894,428 | 1/1990 | Thoma et al. | 528/45 |
| 4,900,415 | 2/1990 | Chung et al. | 528/45 |
| 4,976,833 | 12/1990 | Debroy et al. | 528/45 |
| 4,977,201 | 12/1990 | Ogawa et al. | 525/124 |
| 4,983,655 | 1/1991 | Nakata et al. | 524/101 |
| 4,997,900 | 3/1991 | Brinkman | 528/45 |
| 5,010,160 | 4/1991 | Speranza et al. | 528/45 |
| 5,049,249 | 9/1991 | Chung et al. | 528/45 |
| 5,055,522 | 10/1991 | Ikeda et al. | 525/124 |

FOREIGN PATENT DOCUMENTS 5952901 10/1980 Japan.

OTHER PUBLICATIONS

Chemical Abstracts of JPN Kokai Tokkyo Koho 80,118,948 (corresponding to JPN Patent Publication No. 59–52901/1980); 94:105052n; vol. 94; 1981; page 93.
Modern Paint and Coatings, Feb. 1985, pp. 78–87.
Chemical Abstracts of U.S. Pat. No. 4,694,051; 108:39790f, vol. 108; 1988; page 103.

*Primary Examiner*—John Kight, III
*Assistant Examiner*—Rabon Sergent
*Attorney, Agent, or Firm*—Oblon, Spivak, McClelland, Maier & Neustadt

[57] ABSTRACT

Coating compositions, comprising (I) blocked urethane prepolymers, particularly those derived from tetramethyl-xylene diisocyanate, and (II) curatives, such as polyether polyamines, oxyalkylene ethers of polyamines and ketimines of polyamine, are disclosed. Plastisol compositions, which comprise vinyl chloride polymers, plasticizers, and adhesion promoters, comprising (I) a blocked polyisocyanate, such blocked urethane prepolymers as above, or isocyanurate or biuret-containing blocked polyisocyanate, and (II) active amino group-containing mono- or poly-amide compounds, are also disclosed. These compositions are useful for coating metal surface to improve resistance to chipping.

23 Claims, No Drawings

COATING COMPOSITION AND PLASTISOL COMPOSITION, AND ARTICLES COATED THEREWITH

BACKGROUND OF THE INVENTION

1. Field of the Invention

This invention relates to coating composition and plastisol composition. More particularly, it relates to anti-chipping coating composition and plastisol composition useful for coating metallic surface.

2. Description of the Prior Art

As anti-chipping coating compositions, there have been proposed those comprising blocked urethane prepolymers and polyoxyalkylene polyamines or alkylene oxide adducts of alkylene diamines, disclosed in JPN Patent Lay-open Nos. 226062/1984 and 168957/1982.

Polyvinylchloride plastisol compositions containing adhesion promoters comprising blocked urethane prepolymers and active amino group-containing mono- or poly-amides are already disclosed in JPN Patent Publication No. 52901/1984.

Such coating compositions have drawbacks, such as insufficient adhesion properties (curability) with heat treatment at lower temperature within shorter period of time and also poor resistance to chipping, or have problems of poor appearance of coatings, such as blister, skim and pinhole, or poor storage stability.

SUMMARY OF THE INVENTION

It is an object of the present invention to provide a coating composition having improved adhesion properties (curability) with heat treatment even at lower temperature or within shorter period of time.

It is another object of the present invention to provide such a coating composition having improved resistance to chipping.

It is still another object of the present invention to provide a coating composition or a plastisol composition, having improved coating properties.

It is yet another object of the present invention to provide a coating composition or a plastisol composition, having improved storage stability.

Briefly, these and other objects of the present invention as hereinafter will become more readily apparent have been attained broadly by a coating composition, comprising (I) a blocked urethane prepolymer derived from α, α, α', α'-tetramethyl-xylylene diisocyanate (hereinafter referred to as TMXDI), and (II) one or more curatives, such as polyoxyalkylene polyamines, oxyalkylene ethers of mono- or polyamine, ketimines of polyoxyalkylene polyamine, ketimines of polyamide compound, ketimines of mono- or poly-alkylene polyamine, and epoxy-modified products of these compounds; by a coating composition, comprising (I) a blocked urethane prepolymer, and (II) a ketimine of a polyamine; or by a plastisol composition, which comprises: [A] vinyl chloride polymer, [B] a plasticizer, and [C] an adhesion promoter, such as those comprising: 1) (I) a blocked urethane prepolymer derived from TMXDI, and (II) an active amino group-containing amide compound; or 2) (I) an isocyanurate or biuret group-containing blocked polyisocyanate, and (II) an active amino group-containing amide compound; or 3) (I) a blocked polyisocyanate, and (II) an organic silane compound.

DETAILED DESCRIPTION OF THE PREFERRED EMBODIMENTS

(I) Blocked Polyisocyanates

Suitable blocked urethane prepolymers derived from TMXDI, used in a preferable embodiment of this invention, include ones obtained by reacting (or blocking) (a) an NCO-terminated urethane prepolymer derived from at least one polyol and at least one organic polyisocyanate comprising TMXDI, with (b) a blocking agent.

As TMXDI, there may be mentioned o-, m- and p-isomers, and mixtures of these isomers. Preferred is m-TMXDI.

Said organic polyisocyanate may contain, in addition to TMXDI, one or more other organic polyisocyanates. Suitable polyisocyanates include aliphatic polyisocyanates containing 2–18 carbon atoms (except carbon atoms in NCO groups), alicyclic polyisocyanates containing 4–15 carbon atoms, aromatic polyisocyanates containing 6–20 carbon atoms, araliphatic polyisocyanates containing 8–15 carbon atoms, and modified polyisocyanates of these polyisocyanates containing urethane, carbodiimide, allophanate, urea, biuret, urethdione, urethonimine, isocyanurate and/or oxazolidone groups. Illustrative examples of polyisocyanates are: aliphatic polyisocyanates, such as ethylene diisocyanate, tetramethylene diisocyanate, hexamethylene diisocyanate (HDI), dodecamethylene diisocyanate, 1,6,11-undecane diisocyanate, 2,2,4-trimethyl-HDI, lysine diisocyanate, 2,6-diisocyanato-methyl caproate, bis(2-isocyanato-ethyl) fumarate, bis(2-isocyanato-ethyl) carbonate, 2-isocyanato-ethyl-2,6-diisocyanato-hexanoate, and the like; alicyclic polyisocyanates, such as dicyclohexylmethane diisocyanate (hydrogenated MDI), isophorone diisocyanate (IPDI), cyclohexane diisocyanate (CHDI), methylcyclohexylene diisocyanate (hydrogenated TDI), hydrogenated xylylene diisocyanate, bis(2-isocyanato-ethyl) 4-cyclohexene-1,2-dicarboxylate, and the like; aromatic polyisocyanates, such as 1,3- and/or 1,4-phenylene diisocyanates, 2,4- and/or 2,6-tolylene diisocyanates (TDI), crude TDI, diphenylmethane-4,4'- and/or -2,4'-diisocyanates (MDI), crude MDI or polymethylene-polyphenylene polyisocyanates (PAPI), naphthalene-1,5-diisocyanate, triphenylmethane-4,4',4"-triisocyanate, m- and/or p-isocyanatophenyl sulfonyl isocyanate, and the like; araliphatic polyisocyanates, such as xylylene diisocyanates (XDI), diethylbenzene diisocyanates, and the like; modified polyisocyanates, such as urethane-modified TDI, carbodiimide-modified MDI, trihydrocarbyl phosphate-modified MDI, isocyanurate-modified IPDI, isocyanurate-modified TDI, and the like; as well as mixtures of two or more of them, such as combination of modified MDI with urethane-modified TDI. Among these, preferred are HDI, hydrogenated MDI, IPDI, CHDI, TDI, MDI and XDI.

The content of TMXDI in organic polyisocyanates is usually at least 50%, preferably at least 60% by weight.

Polyols usable for producing said NCO-terminated urethane prepolymer (a) include high molecular weight polyols, low molecular weight polyols, and combinations of them.

Suitable high molecular weight polyols include, for example, polyether polyols, polyester polyols, polymer/polyols, and mixtures of them.

Suitable polyether polyols are those obtainable by ring-opening polymerization of alkylene oxide or by addition of alkylene oxide to one or more compounds containing at least two (preferably two to eight) active hydrogen atoms, such as polyhydric alcohols, polyhydric phenols, amines, polycarboxylic acids, phosphoric acids and the like, and mixtures of two or more of them. Illustrative of such polyhydric alcohols are diols, for example, alkylene glycols, such as ethylene glycol, propylene glycol, 1,3- and 1,4-butane diols, 1,6-hexane diol, 3-methyl-1,5-pentane diol, neopentyl glycol, diethylene glycol, and the like, and cyclic group-containing diols, as written in JPN Patent Publication No. 1474/1970, such as bis(hydroxymethyl) cyclohexane, bis(hydroxyethyl) benzene, and the like; trihidric alcohols, such as glycerol, trimethylolpropane, trimethylolethane, hexane triols, triethanol amine, and the like; tetrahydric alcohols, such as pentaerythritol, alpha-methylglucoside, diglycerol, and the like, and polyols having higher functionality (5–8 or higher), for instance, sugar alcohols, such as sorbitol and mannitol, saccharides, such as sucrose, glycosides, such as glucosides of polyols (such as di-, tri- and tetrahydric alcohols as above), poly(alkane polyol)s, such as di-, tri- and tetra-glycerols, and di- and tri-pentaerythritols, and cycloalkane polyols, such as tetrakis(hydroxymethyl) cyclohexanol. Exemplary of suitable polyhydric phenols are mononuclear phenols, such as hydroquinine, catechol, resorcin, pyrogallol and phloroglu-cinol, and polynuclear phenols, for example, bisphenols, such as bisphenol A, bisphenol F, bisphenol sulfon and the like, as well as phenol-formaldehyde condensation products (novolaks), such as polyphenols as disclosed in U.S. Pat. No. 3,265,641. Suitable amines are inclusive of ammonia; alkanol amines, such as mono-, di- and tri-ethanol amines and iso-propanol amines, and aminoethyl ethanol amine and the like; aliphatic, aromatic, araliphatic and alicyclic monoamines, for example, $C_1$–$C_{20}$ alkyl amines (such as methyl, ethyl, iso-propyl, butyl, octyl and lauryl amines), aniline, toluidine, naphthyl amines, benzyl amine, cyclohexyl amine and the like; aliphatic, aromatic, araliphatic and alicyclic polyamines, such as $C_2$–$C_6$ alkylene diamines (such as ethylene, propylene and hexamethylene diamines), polyalkylene polyamines (such as diethylene triamine, triethylene tetramine and the like), aromatic diamines (such as tolyene diamines, phenylene diamines, xylylene diamines, methylene dianilines, diphenylether diamines and the like), alicyclic diamines (such as isophorone diamine, cyclohexylene diamines, dicyclohexylmethane diamines and the like); and heterocyclic polyamines, such as piperazine, N-aminoethylpiperazine and other heterocyclic polyamines, described in JPN Patent Publication No. 21044/1980. Suitable polycarboxylic acids include those described bellow in the description of polyester polyols. Among these active hydrogen atom-containing compounds, preferred are polyhydric alcohols, particularly ethylene glycol, propylene glycol, 1,4-butane diols, 1,6-hexane diol, neopentyl glycol, diethylene glycol, glycerol, trimethylolpropane, pentaerythritol, alpha-methylglucoside, sorbitol and sucrose.

Suitable alkylene oxides, employed for producing polyether polyols, include, for example, ethylene oxide, propylene oxide, 1,2-, 2,3-, 1,3- and 1,4-butylene oxides, styrene oxide, epichlorohydrin and the like, as well as combinations of two or more of them (block and/or random addition). Among these, preferred are ethylene oxide, propylene oxide, and 1,4-butylene oxide (tetrahydrofuran).

Suitable polyester polyols are inclusive of polycondensation products of polyols with dicarboxylic acids or ester-forming derivatives thereof (such as anhydrides, esters and halides), polyactone polyols obtainable by ring-opening polymerization of lactones in the presence of poylols, and polycarbonate polyols obtainable by reaction of carbonate diesters with polyols. Suitable polyols include low molecuar weight polyols [such as polyhydric alcohols mentioned above as the raw materials for polyether polyols, preferably dihydric alcohols (such as ethylene glycol, propylene glycol, 1,4-butane diol, 1,6-hexane diol, neopentyl glycol and diethylene glycol) or combinations thereof with trihidric or higher functional polyhydric alcohols (such as glycerol and trimethylolpropane)] and/or polyether polyols (such as those described above). Illustrative of suitable dicarboxylic acids and derivatives thereof are aliphatic or cycloaliphatic dicarboxylic acids, such as glutaric, adipic, sebacic, fumaric and maleic acids, and dimeric acids; and aromatic dicarboxylic acids, such as phthalic, isophthalic and terephthalic acids; anhydrides, such as maleic anhydride and phthalic anhydride; and lower alkyl esters, such as dimethyl terephthalate. Examples of suitable lactones include epsilon-caprolactone. Suitable carbonate diesters include, for example, dialkyl carbonates, such as dimethyl carbonate and diethyl carbonate.

Suitable polymer/polyols include those obtainable by polymerization of ethylenically unsaturated monomers (such as acrylonitrile, styrene and the like) in situ in polyols (polyether polyols and/or polyester polyols, with or without low molecular weight polyols), for example, those written in U.S. Pat. No. 3,383,351, JPN Patent Publication Nos. 24737/1964 and 47597/1972, and JPN Patent Lay-open Nos. 15894/1975 and 118948/1980.

Among these high molecular weight polyols, preferred are polyether polyols, particularly polytetramethylene ether glycols, and polyester polyols, especially polyethylene adipate diols and polycaprolactone polyols.

Equivalent weight (molecular weight per hydroxyl group) of high molecular weight polyols is usually 300–3000 or higher, preferably 400–2500.

Low molecular weight polyols include polyhydric alcohols, as described above as the raw materials for polyether polyols; low molecular weight alkylene oxide adducts of active hydrogen atom-containing compounds (such as polyhydric alcohols, as described above); low molecular weight polylactone polyols (such as polycaprolactone polyols); and mixtures of two or more of them. Among these, preferred are ethylene glycol and trimethylol propane. Equivalent weight (molecular weight per hydroxyl group) of low molecular weight polyols is usually 30–300, preferably 40–300.

Among polyols used for producing NCO-terminated urethane prepolymer (a), preferred are high molecular weight polyols and/or low molecular weight polyols, having an average functionality of at least 2.01 (especially 2.1–3 or higher). Examples of such polyols include those comprising a high molecular weight diol having an equivalent weight of 300–3000 and a low molecular weight triol having an equivalent weight of 40–300, those comprising a high molecular weight triol having an equivalent weight of 300–2500 and a low molecular weight diol having an equivalent weight of 30–300, those comprising a diol having an equivalent weight of 300–500 and a triol having an equivalent weight of 40–500, and those comprising a triol having an equivalent weight of 300–500 and a low molecular weight diol having an equivalent weight of 30–300.

In producing NCO-terminated urethane prepolymers, NCO/OH ratio (equivalent ratio of organic polyisocyanate to polyol) is usually 1.3–3, preferably 1.5–2.2.

Reaction of organic polyisocyanate with polyol may be carried out in the presence of catalyst, solvent and/or plasticizer, such as those used generally for this purposes. Illustrative of catalysts are organo-metallic compounds, such as dibutyltin dilaurate, stannous octoate and the like, and amines, such as triethylene diamine, triethyl amine, 1,8-diazabicyclo[5,4,0]undecene-7 and the like. Suitable solvents include, for example, aromatic hydrocarbons, such as toluene, xylene, trimethylbenzene and the like; esters, such as ethyl acetate, butyl acetate and the like; ethers, such as dioxane, cellosolve acetate, and the like; ketones, such as acetone, methyl ethyl ketone, and the like; and mixed solvents of two or more of them. Examples of plasticizers are ester-type plasticizers, including phthalates, such as diethyl phthalate, dibutyl phthalate, dioctyl phthalate, dilauryl phthalate, distearyl phthalate, diisononyl phthalate and the like; adipates, such as dioctyl adipate and the like; sebacates, such as dioctyl sebacate and the like; phosphates, such as tricresyl phosphate and the like; and mixtures of two or more of them.

Reaction temperature is generally 40°–140° C., preferably 60°–120° C.; and reaction time is usually 3–10 hours, preferably 4–8 hours.

Molecular weight of NCO-terminated urethane prepolymer is usually 500–10,000, preferably 700–8,000. In case where molecular weight is less than 500, the resulting resin are too rigid and brittle and of poor resistance to chipping. On the other hand, molecular weight more than 10,000 results in poor adhesion properties.

NCO content of NCO-terminated urethane prepolymer is generally 1–20%, preferably 2–15%.

Blocking agents (b) employed for blocking NCO-terminated urethane prepolymers include, for example, those described in U.S. Pat. No. 4,524,104 and "Progress in Organic Coatings", 3(1975)73–99. Illustrative of suitable blocking agents are oximes (ketoximes and aldoximes), such as acetone oxime, methyl ethyl ketone oxime (MEK oxime), methyl isobutyl ketone oxime (MIBK oxime), cyclohexanone oxime, and the like; lactams, such as epsilon-caprolactam, delta-valerolactam, gamma-butyrolactam, and the like; activated methylene group-containing compounds, for example, malonic acid diesters (such as diethyl malonate), acetyl acetone, aceto-acetic acid esters (such as ethyl aceto-acetate), and the like; phenols, such as phenol, m-cresol, and the like; alcohols, such as methanol, ethanol, n-butanol, and the like; hydroxyl group-containing ethers, such as methylcellosolve, butylcellosolve, and the like; hydroxyl group-containing esters, such as ethyl lactate, amyl lactate, and the like; mercaptans, such as butyl mercaptan, hexyl mercaptan, and the like; acid amides, such as acetoanilide, acrylamide, dimeric acid amides, and the like; imidazoles, such as imidazole, 2-ethyl imidazole, and the like; acid imides, such as succinimide, phthalimide, and the like; and mixtures of two or more of them. It is those having deblocking (dissociation) temperature of generally 50°–100° C. that are preferred for low-temperature baking. Among these, preferred are oximes, lactams, and combinations of them; and particularly preferred are MEK oxime and/or epsilon-caprolactam.

Blocking agent (b) can be added at any stage of reaction of organic polyisocyanate with polyol, forming NCO-terminated urethane prepolymer (a), to obtain blocked urethane prepolymer (I). For instance, (b) may be added after production of (a), or before or during production of (a), or a part of (b) may be added before or during production of (a), followed by adding the rest of (b) after preparation of (a). Among these, preferred are adding (b) after production of (a)

In case of adding (b) after production of (a), (b) is used in such an amount providing equivalent ratio of (b) to (a) of usually at least 1 and less than 2, preferably 1.05–1.5. When (b) is added before or during production of (a), it is preferred to use the raw materials in such an amount providing substantially equivalent amount of the polyisocyanate to the total amount of the polyol and (b).

Blocking reaction of (a) with (b) may be carried out in the presence of catalyst, solvent and/or plasticizer, such as those mentioned above.

Suitable blocked urethane prepolymers, used in another embodiment of this invention, include ones obtained by reacting (or blocking) (a) an NCO-terminated urethane prepolymer derived from at least one polyol and at least one organic polyisocyanate, with (b) a blocking agent.

Such blocked urethane prepolymers include those derived from TMXDI, as described above; and ones derived from organic polyisocyanates other than TMXDI.

The latters can be produced in the same manner from the same raw materials, as in the formers, except TMXDI. Among polyisocyanates other than TMXDI, preferred are aromatic diisocyanates, particularly TDI and MDI. Similar to those derived from TMXDI, among polyols, preferred are high molecular weight polyols and/or low molecular weight polyols, having an average functionality of at least 2.01 (especially 2.1–3 or higher), and preferable blocking agents are oximes (especially MEK oxime) and/or lactams (particularly epsilon-caprolactam).

Suitable isocyanurate ring-containing blocked polyisocyanates, used in another embodiment of the invention, include ones obtainable by reacting (or blocking) (a) an isocyanurate ring-containing polyisocyanate with (b) a blocking agent.

Suitable isocyanurate ring-containing polyisocyanates include ones obtained by polymerizing at least one organic polyisocyanate in the presence of one or more NCO-trimerization catalysts under heating (usually 50°–150° C., preferably 60°–100° C.). Suitable polyisocyanates include those described above, including TMXDI and others. Among them, preferred are aliphatic diisocyanates (particularly HDI) and alicyclic diisocyanates (especially IPDI). Suitable catalysts for trimerization of polyisocyanates include known NCO-trimerization catalysts, such as those disclosed in U.S. Pat. No. 4,299,924. Examples of such catalysts are metal oxides, such as lithium oxide; alkoxides, such as sodium methylate; amines, such as triethyl amone; carboxylates, such as calcium naphthenate; organo-metallic compounds, such as dibutyltin dilaurate; and mixtures of two or more of them.

Isocyanurate ring-containing polyisocyanates may be partially modified with low molecular weight monohydric alcohol or/and polyol.

Suitable low molecular weight monohydric alcohols include, for example, primary alcohols, such as methyl, ethyl, n-butyl, oleyl and stearyl alcohols; secondary alcohols, such as iso-propyl, sec-butyl and sec-amyl alcohols; tertiary alcohols, such as t-butyl and t-amyl alcohols; glycol ethers, such as ethylene glycol monomethyl ether and ethylene glycol monoethyl ether; halo-alcohols, such as ethylene chlorohydrin and 2,2-difluoro-ethyl alcohol; and mixtures of two or more of them. Among these, preferred are primary alcohols. Molecular weight of low molecular weight monohydric alcohols is generally 30–600, preferably 30–300.

Suitable low molecular weight polyhydric alcohols are inclusive of those described above. Illusitrative of such polyols are glycols, such as ethylene glycol, propylene glycol, and 1,4-butane diol; triols, such as glycerol and trimethylol propane, and mixtures of two or more of them. Among these, preferred are glycols. Equivalent weight of low molecular weight polyols is generally 30–300, preferably 30–200.

In addition, isocyanurate ring-containing polyisocyanates may be ones partially modified with high molecular weight polyol (that is isocyanurate ring-containing urethane prepolymers). Suitable high molecular weight polyols include those described above, such as polyether polyols, polyester polyols, polymer/polyols, and mixtures of them.

NCO-content of isocyanurate ring-containing polyisocyanates is usually 5–30%, preferably 8–25%.

Suitable blocking agents and amount thereof may be the same as above. Preferable blocking agents are oximes (especially MEK oxime) and/or lactams (particularly epsilon-caprolactam).

Blocking agent (b) can be added at any stage of reactions (polymerization and/or modification with alcohol or polyol). For instance, (b) may be added after polymerization, or before or during polymerization, or a part of (b) may be added before or during polymerization, followed by adding the rest of (b) after polymerization. Among these, preferred are adding (b) after polymerization.

Reactions (polymerization, modification and/or blocking) may be carried out in the presence of catalyst, solvent and/or plasticizer, such as those mentioned above.

Suitable biuret group-containing blocked polyisocyanates, used in another embodiment of the invention, include ones obtainable by reacting (or blocking) (a) a biuret-modified polyisocyanate with (b) a blocking agent.

Suitable biuret-modified polyisocyanates include ones obtained by biuret-modification or transformation of organic polyisocyanate with water, such as triisocyanate biurets from 3 moles of organic diiocyanates and 1 mole of water. Suitable polyisocyanates include those described above. Amoing them, preferred are aliphatic diisocyanates (particularly HDI) and alicyclic diisocyanates (especially IPDI and hydrogenated MDI).

Biuret-modification can be attained generally in the presence of one or more catalysts [strong bases (for example, tertiary amines, such as triethylene diamine), organo-metallic compounds (for example, tin catalysts, such as dibutyltin dilaurate), and so on], at a temperature of usually 50°–150° C.

Biuret-modified polyisocyanates may also be partially modified with low molecular weight monohydric alcohol or/and polyol, in the same manner as in the isocyanurate ring-containing polyisocyanates.

NCO-content of biuret group-containing polyisocyanates is usually 5–35%, preferably 10–30%.

Suitable blocking agents, preferable ones and amounts thereof may be the same as above.

In this invention, isocyanurate ring-containing blocked polyisocyanate ($a_1$) and biuret group-containing blocked polyisocyanate ($a_2$) may be used alone or in combination, or ($a_1$) and/or ($a_2$) may be used in conjunction with blocked urethane prepolymer (b), such as those described above, preferably those derived from TMXDI, TDI and MDI. Weight ratio of ($a_1$) to ($a_2$) can vary widely, generally 1:99–99:1, preferably 1:9–9:1, more preferably 8:2–2:8. Weight ratio of [($a_1$)+($a_2$)] to (b) can vary widely, generally 1:99–99:1, preferably 1:9–9:1, more preferably 8:2–2:8. Mixtures of ($a_1$) and/or ($a_2$) with (b) may be prepared in any order, for instance, by partial trimerization and/or biuret-modification of urethane prepolymer followed by blocking.

(II) Curatives

Suitable curatives, usable in combination with blocked urethane prepolymer, include ketimines of amino-compounds.

Examples of suitable amino-compounds include polyoxyalkylene polyamine, as described below (such as polyoxypropylene diamines and polyoxypropylene triamines); amino group-containing mono- or polyamide compounds, as described below (such as polyamides, obtained by condensation of polyamines with at least two of dimer acid, monobasic acid and dibasic acid); (poly)alkylene polyamines [meaning alkylene polyamines and polyalkylene polyamines; similar expressions are used hereinafter], as mentioned above, such as ethylene diamine, diethylene triamine, propylene diamine, hexamethylene diamine; (poly)cycloalkylene polyamines, such as 1,8-p-menthane diamine, isophorone diamine, cyclohexylene diamines, 4,4'-dicyclohexylmethane diamines, 1,3-bis(aminomethyl) cyclohexane and 3-aminomethyl-3,3,5-trimethylcyclohexyl amine; aromatic polyamines, as mentioned above, such as xylylene diamines, methylene dianilines and tolylene diamines; and mixtures of two or more of them. Among these amino-compounds, preferred are polyoxyalkylene polyamines (particularly polyoxypropylene diamines), polyamides and (poly) (cyclo)alkylene polyamines (particularly diethylene triamine and 4,4'-dicyclohexylmetane diamine).

Suitable ketimines of amino-compounds include ones obtainable by reaction (dehydration condensation) of these compounds with one or more ketones. Illustrative examples of suitable ketones are acetone, methyl ethyl ketone, methyl n-propyl ketone, methyl iso-propyl ketone, methyl iso-butyl ketone (hereinafter referred to as MIBK), diethyl ketone, di-n-propyl ketone, di-iso-propyl ketone, di-n-butyl ketone, di-iso-butyl ketone, and the like. The most preferred is MIBK. The reaction is usually carried out in the presence of dehydrating agent while distilling off water. For instance, amino-compound is mixed with a stoichiometrically excess ketone and a suitable solvent (such as toluene and xylene), followed by heating the mixture under reflux to proceed dehydration while distilling off water, and optionally removing excess ketone and the solvent.

Illustrative examples of ketimines include MIBK ketimines of polyoxypropylene triamines, diethylene triamine, ethylene diamine, hexamethylene diamine, 1,3-bis(aminomethyl)cyclohexane, 4,4'-dicyclohexylmetane diamine, and 3,3'-dicyclohexylmetane diamine; and acetone ketimine of ethylene diamine.

Suitable curatives, usable in combination with blocked urethane prepolymer derived from TMXDI, include, for example, ketimines as mentioned above; polyoxyalkylene polyamines; oxyalkylene ethers of mono- or polyamine; and epoxy-modified products of one or more of these compounds.

Suitable polyoxyalkylene polyamines include ones obtainable by converting the terminal hydroxyl groups of polyether polyols into amino groups, for example, by ammonolysis. Examples of suitable polyether polyols are those mentioned above, such as polyoxyalkylene diols, triols, tetraols and the like, obtained by adding alkylene oxides to initiators, such as ethylene glycol, propylene glycol, diethylene glycol, glycerol, trimethylol propane, ethylene diamine and the like. Illustrative of polyoxyalkylene polyamines are those represented by the general formulae (1) and (2), such as polyoxypropylene polyamines (diamines or triamines) derived from polypropylene glycols or polyoxypropylene triols.

$$H_2N-A(OA)_nNH_2 \qquad (1)$$

$$X[(OA)_mNH_2]_3 \qquad (2)$$

wherein A represents alkylene group (such as propylene group), X represents the residue of triol (such as trimethylol propane), n is an integer of about 2–50, and the total of m is about 3–50.

Oxyalkylene ethers of mono- or polyamines can be obtained by adding one or more alkylene oxides to one or more mono- or/and polyamines. Suitable alkylene oxides and mono- and polyamines include those mentioned above as the raw materials for polyether polyols. Illustrative of suitable amines are alkanol amines, such as di-and tri- ethanol amines; (poly)ethylene polyamines, such as ethylene diamine, diethylene triamine, triethylene tetramine, tetraethylene pentamine and pentaethylene hexamine; (poly)propylene polyamines, such as propylene diamine, dipropylene triamine and tripropylene tetramine; (poly)cycloalkylene polyamine, such as 1,8-p-menthane diamine, isophorone diamine, cyclohexylene diamines, 4,4'-dicyclohexylmethane diamines and 1,3-bis(aminomethyl)cyclohexane. Among these, preferred are triethanol amine, ethylene diamine, diethylene triamine and dipropylene triamine. Among alkylene oxides, preferred are ethylene oxide, propylene oxide and combinations of them (block addition, random addition, or combinations of both). Equivalent weight of oxyalkylene ethers of mono- or polyamines is usually at least 30, preferably 60–500.

Suitable epoxy-modified products include, for example, ones obtainable by modifying one or more of these compounds (polyoxyalkylene polyamines, oxyalkylene mono-or polyamines and ketimines of amino-compounds) with one or more epoxy compounds. Illustrative examples of epoxy compounds are glycidyl ethers, such as bisphenol A glycidyl ether, polypropyleneglycol diglycidyl ether, phenyl glycidyl ether; glycidyl esters, such as dimeric acid glycidyl ester; glycidyl amines, such as tetraglycidyl diamino diphenyl methane; linear aliphatic epoxides, such as epoxydized polybutadienes; alicyclic epoxides, such as 3,4-epoxy-6-methylcyclohexylmethylcarboxylate; and so on. Among these, preferred are glycidyl ethers.

In another embodiment of the invention, active amino-group-containing mono- or polyamide compound may be used as curative for blocked urethane prepolymer derived from TMXDI, or isocyanurate or biuret-containing blocked polyisocyanate. Such amide compounds include those known as curatives for epoxy resins; for example, monoamide compounds and polyamide compounds, obtainable by reacting polyamines (such as those described above) with at least one of polymerized fatty acids and monobasic acids, or with at least two of polymerized fatty acid, monobasic acid and dibasic acid; and mixtures of two or more of them. Suitable polymerized fatty acids and monobasic acids include those written in JPN Patent Publication Nos. 41121/1978 and 41122/1978, for example, polymerized acids (dimer acids) derived from unsaturated fatty acids (usually $C_{18}$: such as linoleic, linolenic and oleic acids); and saturated fatty acids (such as acetic and stearic acids), unsaturated fatty acids as above, aromatic acids (such as benzoic acid), alicyclic acids (such as naphthenic acid), and hydroxy acids (such as ricinoleic acid). Examples of suitable dibasic acid include dicarboxylic acids described above as to polyester polyols, such as sebacic and adipic acids.

Amine value (primary and secondary amine value) of mono- or polyamide compounds is usually at least 90, preferable 100–450, more preferably 150–400. Compounds of amine value less than 90 are generally of high molecular weight and poor compatibility to plastisol. Illustrative examples of such amide compounds are those written in JPN Patent Publication No. 52901/1984, such as polyamide polyamines, derived from dimer acid and having amine value of 285 and active hydrogen atom equivalent weight of 130.

Active amino group-containing mono- or polyamide compounds may be modified ones, for example, ones partially modified so as to contain imidazoline ring in the molecule; ones modified with electron attractive group-containing vinyl compounds (such as acrylonitrile, epoxy acrylate, and the like), such as those disclosed in JPN Patent Publication Nos. 23560-1976 and 5554/1977; and ketimines, that is ones modified with ketone, as above.

These amide compounds may contain free polyamins, such as those described above, or those written in JPN Patent Lay-open Nos. 122395/1979 and 101899/1979.

Suitable organo-silane compounds, which may be used in another embodiment of this invention, include, for example, amino silane compounds, containing one or more primary or/and secondary amino groups in the molecule. Examples of such organo-silane compounds include the followings:

1. Hydrocarbon group-containing amino-silane compounds, such as those of the general formula (3):

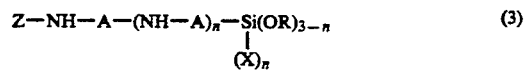
$$Z-NH-A-(NH-A)_n-\underset{\underset{(X)_n}{|}}{Si}(OR)_{3-n} \qquad (3)$$

wherein R represents alkyl group ($C_{1-4}$, such as methyl or/and ethyl groups); X represents H or alkyl group ($C_{1-4}$, such as methyl or/and ethyl groups); A represents divalent hydrocarbon radicals [including alkylene group ($C_{1-4}$, such as ethylene or/and propylene groups) and/or arylene groups (such as phenylene, phenethylene and methylphenethylene groups)]; Z is H,

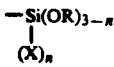

or hydrocarbyl group [for example, alkylgroups (such as $C_{1-4}$ alkyl groups), alkenyl groups (such as allyl group), aryl groups (such as phenyl and phenethyl groups); m is o or 1; and n is o, 1, or 2. Illustrative of such compounds are N-(2-aminoethyl)-3-aminopropyl trimethoxysilane, N-(2-aminoethyl)-3-aminopropyl methyldimethoxysilane, 3-aminopropyl trimethoxysilane, 3-aminopropyl triethoxysilane, 3-aminopropyl methyl diethoxy-silane, bis[3-(tri-ethoxysilyl)propyl] amine, bis[3-(tri-methoxysilyl) propyl] ethylene diamine, N-methylaminopropyl triethoxysilane, 1-trimethoxysilyl-2-[p-(aminomethyl) phenyl] ethane, 1-tri-methoxysilyl-2-[m-(aminomethyl) phenyl] ethane, trimethoxysilyl-propylallyl amine, trimethoxysilylpropyl diethylene triamine, p-aminophenyltrimeth-oxysilane, aminoethyl-trimethoxysilane, and the like;

2. Silazanes, such as 1,3-divinyltetramethyldisilazane, hexamethyldisilazane, and the like;

3. Carbonyl group-containing amino silane compounds, such as methyl-3-[2-(3-trimethoxysilyl-propylamino)ethylamino]-3-propionate, triethoxysilyl-propyl ethyl carbamate, N-(triethoxy-silylpropyl) urea, and so on.

Mixtures of two or more of these compounds may also be used. Among these amino silane compounds, preferred are N-(2-aminoethyl)-3-aminopropyl trimethoxysilane, N-(2-aminoethyl)-3-aminopropyl methyl-dimethoxysilane.

Coating Compositions

Coating compositions, as a preferable embodiment of the present invention, comprises (I) a blocked urethane prepolymer derived from TMXDI, and (II) one or more curatives (such as polyoxyalkylene polyamines, oxyalkylene ethers of mono- or polyamine, ketimines, and epoxy-modified products of these compounds).

Coating compositions, as another embodiment of this invention, (I) a blocked urethane prepolymer, and (II) one or more curatives comprising ketimines.

In these coating compositions, said blocked urethane prepolymer (I) and said curative (II) are used in such an amount providing NCO/active hydrogen atom-containing group equivatent ratio of usually 10/1-½, preferable 2/1-⅜, inview of curability and resistance to chipping.

These curatives may be used alone, or in combination. Combinations of polyoxyalkylene polyamines with ketimines thereof can improve coating properties. Combinations of oxyalkylene ethers of mono- or polyamine with ketimines of polyamide compounds, or combinations of polyoxyalkylene polyamines with ketimines of (poly)alkylene polyamine or with epoxy-modified amines can attain improvements in curability and coating properties.

Coating compositions may contain one or more catalysts to accelerate the reaction of (I) with (II) under heating, whereby lowering of heat treatment temperature and/or reduction of heating time can be attained. Suitable catalysts include those usually employed for deblocking, for example, organo metallic compounds, such as lead octoate, stannous octoate and the like; tertiary amine compounds, such as triethylene diamines, triethyl amine, and the like; and combinations of two or more of them.

Coating compositions can contain colorants, fillers, solvents and other compounding additives, if necessary. Suitable colorants include, for example, inorganic pigments, such as titanium oxide, carbon black, red oxide, yellow oxide, and the like; and organic pigments, such as phthalocyanine blue, phthalocyanine green, and the like. Illustrative of suitable fillers are inorganic fillers, for example, clay, such as kaolin and china clay, diatomaceus earth, calcium carbonate, balium sulfate, talc, alumina, silica, barite, vermiculite, and the like; and organic fillers, such as cellolose powders, powdered rubbers and reproduced rubbers, and the like. Suitable solvents include those mentioned above in the preparation of prepolymers. Examples of other compounding additives are natural and synthetic resins, such as cellulose derivatives, vinyl chloride resins, phenolic resins, ketone resins, synthetic rubbers, unsaturated polyester resins, epoxy resins, melamine resine, urea resins, rosin resins, and the like; various auxiliaries, such as leveling agents, anti-sagging agents (thixotropants), anti-foam agents, surfactants, cure accelerators, anti-cissing agents, pigment dispersants, anti-static agents, and the like.

Illustrative examples of formulations [% by weight] are:

|  | usually | (preferably) |
| --- | --- | --- |
| (I) | 20-90 | (30-70) |
| (II) | 1-40 | (2-30) |
| [Ketimine | 1-40 | (1-25)] |
| Catalysts | 0.01-5 | (0.1-1) |
| Colorants and fillers | 5-80 | (10-60) |
| Solvents | 10-70 | (20-50) |
| Other compounding additives | 1-20 | (1-10) |

Compositions of the invention may be prepared by any known methods. For instance, each component as above can be mixed using conventional mixing equipments (such as dispers, tree-roll mills, ball mills, mills of steel, pebble mills, attritors, sand mills, sand grinders, roll mills, pot mills, bladed high speed stirrers, and the like) to form coating compositions.

Coating compositions of the invention can be applied with any known methods onto substrates, for example, untreated or chemically treated metallic surface (such as iron surface) directly, or anionic or cationic electro-deposit surface thereon.

Coating may be carried out with use of any known equipments, for example, spray coaters, such as air spray, airless spray and hot airless spray machines. Among these, preferred are airless spray machines, in view of shorter time required to obtain coating film of necessary thickness. By using airless spray machines, necessary thickness can be attained usually within 1 stroke or 2 strokes, which may depend upon stroke speed. Other application techniques, such as brushing, rolling, spatula coating and the like can be applied for complicated sites or for repairing.

Stoving temperature of coating compositions of the present invention is usually at least 90° C., preferably 100°-170° C., more preferably 110°-170° C. Stoving time is generally within 120 minutes, preferably 10-60 minutes.

Thickness of dry film is usually 30-500 micron m, preferably 50-350 micron m, in view of sufficient resistance to chipping without such defects as skim, sagging or the like.

Film, formed from coating compositions of this invention, can be coated thereon generally with intercoating and further with top coating.

Intercoating may be applied onto wet film (wet on wet) or onto dry film (dry on wet). In case of wet on wet, intercoat may be applied on wet film of coating compositions of the invention, without any predrying, followed by drying to print free under heating to stoving temperature of usually about 120°–170° C. Suitable compositions for intercoat include those usually used for the purpose of improving gloss of topcoating, filling up in fine roughness of coating film, or so, for example, epoxy resin paints, melamine alkyd resin paints, and the like. Suitable coating methods include, for example, spray coating, electrostatic coating and the like. Intercoating may be omitted.

Suitable compositions for topcoat include those usually used for beautiful apparence, and so on, for example, melamine alkyd resin paints, thermosetting acrylic resin paints, and the like. Top coating can be applied in the same manner as intercoating.

Coating compositions of the invention may be used at any stage of coating. For instance, they may be applied onto prime coat (undercoat), after dry hard, or onto dry hard film of intercoat or topcoat Plastisol Compositions In plastisol compositions, as another aspect of the present invention, comprising [A] vinyl chloride polymer, [B] plasticizer and [C] adhesion promoter, suitable adhesion promoters include:

(1) those comprising (I) a blocked urethane prepolymer derived from organic polyisocyanate comprising TMXDI and (II) an active amino group-containing amide compound;

(2) those comprising (I) a blocked polyisocyanate comprising ($a_1$) isocyanurate ring-containing blocked polyisocyanate and/or ($a_2$) biuret group-containing blocked polyisocyanate, or combinations of ($a_1$) and/or ($a_2$) with (b) blocked urethane prepolymer, and (II) an active amino group-containing amide compound;

(3) those comprising (I) a blocked polyisocyanate, which may be one or more of ($a_1$), ($a_2$) and (b) as above, and (II) an organic silane compound.

Each material used for these adhesion promoters include those mentioned herein-before.

In the above adhesion promoters (2), the weight ratio of ($a_1$) to ($a_2$) is usually 1:99–99:1, preferably 1:9–9:1, more preferably 4:1–1:4. The amount of ($a_1$) and/or ($a_2$) is generally at least 1%, preferably at least 10%, more preferably at least 20%, based on the total weight of the blocked polyisocyanate (I). The weight ratio of [($a_1$)+($a_2$)] to (b) may be usually 1:99–99:1, preferably 1:9–9:1, more preferably 4:1–1:4.

In the above adhesion promoters (3), ($a_1$), ($a_2$) and (b) may be used alone or in combination, and the weight ratio of them is not particularly critical, but the same range as above (2) may be prefered.

In these adhesion promoters (1), (2) and (3), (I) and (II) may be used in such an amount providing NCO/active hydrogen atom-containing group equivatent ratio of usually 10/1-⅓, preferable 2/1-⅔, inview of curability and resistance to chipping.

Suitable vinyl chloride polymers [A] include polyvinylchlorides and copolymers of vinyl chloride, usually used for plastisol compositions. Suitable copolymers are copolymers of vinyl chloride with one or more monomers copolymerizable therewith, for example, vinyl esters (such as vinyl acetate, vinyl propionate and higher fatty esters), unsaturated carboxylic aicds [such as (meth)acrylic, crotonic, maleic, itaconic and fumaric acids], anhydride thereof (such as maleic anhydride), esters thereof [such as maleic esters, (meth)acrylic esters], vinyl ethers, vinylidene chloride, and the like. Polymerization degree of vinyl chloride polymers are generally 1000–1700. Illustrative of suitable vinyl chloride polymers are Kanevinyl PSL-10, PSH-10 and PCH-12, produced by Kanegafuchi Kagaku Kogyo K. K.; Zeon 121 and 135J, produced by Nippon Zeon Co. Ltd.; and Denkavinyl PA-100 and ME-180, produced by Denki Kagaku Kogyo K. K. Two or more of these may also be used.

As the plasticizer [B], any of those customarily utilized for this purpose may be used. Examples of suitable plasticizers are ester plasticizers, for example, esters of phthalic acid, particularly (cyclo)alkyl esters, such as diethyl phthalate, dibutyl phthalate, dioctyl phthalate, didecyl phthalate, distearyl phthalate, di-isononyl phthalate, dimethylcyclohexyl phthalate, octyl decyl phthalate and the like; esters of adipic or sebacic acid, such as dibutyl adipate, dioctyl adipate, didecyl adipate and the like, and the corresponding sebacates; esters of phosphoric acid, such as tricresyl phosphate and the like; and other plasticizers, such as those disclosed in U.S. Pat. No. 3,523,984 and 4,518,729; as well as mixtures of two or more of them. Among these, preferred are phthalates, particularly dioctyl phthalate.

Plastisol compositions may contain, if necessary, one or more additives, for example, catalysts, colorants, fillers, solvents and other compounding additives, as described herein-before; and stabilizers, such as metal soaps (such as calcium stearate, aluminum stearate and the like), inorganic salts (such as dibasic phosphites, dibasic sulfates and the like), and organo-metallic compounds (such as dibutyltin dilaurate, dibutyltin malate and the like), and so on.

In plastisol compositions of the invention, comprising vinyl chloride polymer [A], plasticizer [B] and adhesion promoter [C], the content of each component is not particularly restricted. Illustrative formulations [% by weight] of plastisols are: usually (preferably)

| | | |
|---|---|---|
| [A] | 10–50 | (20–40) |
| [B] | 10–50 | (20–40) |
| [C] | 0.5–20 | (1–10) |
| Additives | 0–70 | (0–60) |

Plastisol compositions of the invention may be prepared by any known methods, for instance, by using conventional mixing equipments (such as dispersion mixers and the like).

Plastisol compositions of the invention can be applied with any known methods onto substrates, for example, untreated or chemically treated metallic surface (such as iron or steel surface) directly, or undercoated surfaces with various primers. It is particularly advantageous to apply onto cationic electro-deposit surface or acrylic resin coated surface.

Suitable cationic electro-deposition methods include, for example, those by preparing electrodeposition coating compositions, containing film-forming components of cationic resins (polyamino resins, such as amino group-containing epoxy resins and the like), neutralized with lower organic acids or the like to disperse into aqueous solution or aqueous dispersion, followed by charging them with direct current using the metal to be coated as the cathod.

Suitable acrylic resin coatings include thermoplastic ones, for example, thoes containing acrylic (co)polymers combined with cellulose derivatives (such as nitro cellulose, cellulose acetate butyrate and the like), plasticizers and so on, primarily used room temperature drying purpose; and thermosetting ones, for instance, those comprising acrylic (co)polymers containing functional groups, capable of reacting each other or with cross-linking agent to form tree dimensional network.

Plastisol compositions containing organic silane compounds can also be advantageously applied onto various plated or deposited steel plates, such as tinned steel plates, lead-tin alloy-plated steel plates, aluminized steel plates, nickeled steel plates, and other various alloyed steel plates. Plating can be carried out by depositing coatings on the surface to be coated through electroplating, meltplating, diffusionplating, flame spraying and the like.

Coating may be carried out with use of any known techniques, for example, brushing, spray coating (air spray and airless spray), electrostatic coating, powder coating, roller coating, flow coating, dip coating, and the like.

Amount of coatings is usually 500-3000 g/m$^2$, coating build-up is generally 0.3-2 mm.

After application of plastisol compositions, heat treatment is generally at a temperature of 120°-140° C., usually for 20-40 minutes.

Effects

Coating compositions of the present invention, comprising said blocked urethane prepolymer derived from TMXDI and said curative, can be cured and adhered to primary coat of electro-deposit coating film, even at a lower temperature or within shorter period of time, to give improved adhesion properties. In addition, the compositions can provide improved coating properties and improved resistance to chipping, and therefore can attain excellent anticorrosion when applied to wheeled vehicles and so on.

Coating compositions of this invention, comprising said blocked urethane prepolymer and said ketimine, can attain improved effects in coating properties to primary coat of electro-deposit coating film, resistance to chipping, and resistance to hot water, and accordingly can provide excellent anticorrosion when applied to wheeled vehicles and so on.

Thus, these coating compositions resistant to chipping are particularly useful as anticorrosive paints for vehicles, such as automobiles.

Plastisol compositions of the invention can be baked at lower temperature (such as at a temperature lower by 10°-20° C. than those in the prior art), with sufficient adhesion properties and storage stability of plastisols. Therefore, the compositions can provide remarkable reducuction of thermal energy required for application and are industrially of high merit. The plastisol compositions can be strongly adhered not only to cationic electrodeposit but also acrylic coating film, even at a lower temperature or within shorter period of time (such as at 120° C., for 20 minutes). In addition, the compositions have excellent storage stability (for instance, stable even under severe conditions of 40° C. for 14 days), and show little increase of viscosity.

Thus, these plastisol compositions are applicable to various industrial uses, such as adhesives, sealants, paints and the like; and particularly useful in the field of automotive industry, especially as coatings for body sealer and undercoat of automobile bodies coated with cationic electro-deposit as primer.

Plastisol compositions, containing said isocyanurate or biuret-containing blocked isocyanate, can impart improved adhesivity to electro-deposit with use of smaller amount, and excellent stability.

In addition, plastisol compositions of the invention, containing said blocked polyisocyanate and said organic silane compound, have excellent adhesion properties to various plated or deposited steel plates and electro-deposit coating film, even with use of smaller amount; and are particularly useful in the field of automotive industry, especially as coatings for gas tank, body sealer and undercoat of automobile bodies coated with cationic electro-deposit as primer and various plated or deposited steel plates.

Having generally described the invention, a more complete understanding can be obtained by reference to certain specific examples, which are included for purposes of illustration only and not intended to be limiting unless otherwise specified.

In the following examples, parts, ratio and % mean parts by weight, weight ratio and % by weight, respectively, and NCO content is based on the weight of nonvolatile matters.

Commercially available raw materials, used in the following examples, are as follows:

Jeffermine T-403: a polyoxypropylene triamine (MW:about 450), sold by Mitsui-Texaco Chemical.

PSL-10: Kanevinyl PSL-10, a straight polyvinylchloride, sold by Kanegafuchi Kagaku Kogyo.

PCH-12: Kanevinyl PCH-12, a vinyl chloride copolymer, sold by Kanegafuchi Kagaku Kogyo.

DOP: dioctyl phthalate.

NCC-100: calcium carbonate, sold by Nippon Funka Kogyo. L-2590: Polyamide L-2590, a polyamide polyamine (amine value: 285, active hydrogen equivalent: 130), sold by Sanyo Chemical Industries.

Corronate EH: an isocyanurate derived from HDI (NCO 21.3%), sold by Nippon Polyurethane Industries.

Duranate 24A-100: a biuret-modified polyisocyanate derived from HDI (NCO 23.3%), sold by Asahi Chemical Industries.

KBM-603: N-(2-aminoethyl)-3-aminopropyltrimethoxysilane, sold by Shin-etsu Chemical Industries.

EXAMPLE 1

(1) Preparation of Blocked Urethane Prepolymer

Into a reaction vessel, having a stirrer, a thermometer and a nitrogen inlet tube, 259 parts of TMXDI, 212 parts of PTMG (MW: 1000), 28 parts of trimethylol propane and 400 parts of carbitol acetate were charged and reacted for 5 hours at 80°-100° C. under an atmosphere of nitrogen, followed by adding 0.1 part of dibutyltin dilaurate and further reacting additional 3 hours to obtain a urethane prepolymer (NCO content: 8.9%). Then, 101 parts of MEK oxime was added thereto, followed by reacting for 3 hours at 60°-80° C. to obtain a blocked urethane prepolymer [1] (nonvolatile content 60%). It was confirmed with infrared spectrum that free NCO group (absorption at 2250 cm$^{-1}$) had disappeared.

(2) Coating Compositions

Using the blocked urethane prepolymer thus obtained, anti-chipping coating compositions were produced under the following formulations (parts).

|  | Example No. | | |
|---|---|---|---|
|  | 1-1 | 1-2 | 1-3 |
| Blocked urethane prepolymer [1] | 100 | 100 | 100 |
| Jeffermine T-403 | 16 | — | — |
| Diethylene triamine PO adduct (MW:400) | — | 9 | — |
| Ketimine of Jeffermine T-403 and MIBK | — | — | 24 |
| Calcium carbonate | 80 | 80 | 80 |
| Titan white | 5 | 5 | 5 |
| Carbon black | 1 | 1 | 1 |
| Aromatic petroleum naphtha (b.p. range: 100-200° C.) | 30 | 30 | 30 |

Onto an electro-deposit steel plate (obtained by electro-deposition of cationic electro-deposition coating composition containing epoxy resin, followed by curing and baking to form anti-corrosive primer coating), each coating composition as above was applied with an airless spray coater so as to provide dry film of 200 micron m thickness, followed by baking and curing for 15 minutes at 120° C.

EXAMPLE 2

(1) Preparation of Blocked Urethane Prepolymer

In the same manner as in Example 1 (1), 210 parts of TMXDI, 287 parts of polycaprolactone diol (MW:1000), 29 parts of polycaprolactone triol (MW:300) and 400 parts of carbitol acetate were reacted to obtain a urethane prepolymer (NCO content: 3.9%).

Then 74 parts of MEK oxime were added thereto and reacted in the same manner as in Example 1 (1) to obtain a blocked urethane prepolymer [2-1].

To the same urethane prepolymer as above, 97 parts of epsilon-caprolactam were added and reacted for 3 hours at 100° C. to obtain another blocked urethane prepolymer [2-2].

These blocked urethane prepolymers [2-1] and [2-2] were mixed in the weight ratio of 1/1 to obtain a mixed blocked urethane prepolymer [2].

(2) Coating Composition

Using the mixed blocked urethane prepolymer, an antichipping coating composition was produced under the following formulation (parts).

| Mixed blocked urethane prepolymer [2] | 100 |
|---|---|
| Jeffermine T-403 | 7 |
| Diethylene triamine-MIBK ketimine (Total amine value: about 280) | 9 |
| Calcium carbonate | 80 |
| Titan white | 5 |
| Carbon black | 1 |
| Aromatic petroleum naphtha (b.p. range: 100-200° C.) | 30 |

In the same manner as in Example 1 (2), the coating composition was applied onto an electro-deposit steel plate, followed by baking and curing.

COMPARATIVE EXAMPLES 1 AND 2

(1) Preparation of Blocked Urethane Prepolymers (1) In the same manner as in Example 1(1), 210 parts of TDI, 242 parts of PTMG (MW: 1000), 32 parts of trimethylol propane and 400 parts of carbitol acetate were reacted at 70°-80° C. to obtain a urethane prepolymer. Then 116 parts of MEK oxime were added thereto and reacted in the same manner as in Example 1 (1) to obtain a blocked urethane prepolymer [1'].

(2) In the same manner as above, 210 parts of TDI, 242 parts of PTMG (MW: 1000), 32 parts of trimethylol propane and 422 parts of carbitol acetate were reacted to obtain a urethane prepolymer. Then 150 parts of epsilon-caprolactam were added and reacted for 3 hours at 80°-100° C. to obtain another blocked urethane prepolymer [2'].

(2) Coating Composition

Using these blocked urethane prepolymers, anti-chipping coating compositions were produced under the following formulations (parts).

|  | Comparative Example No. | |
|---|---|---|
|  | 1 | 2 |
| Blocked urethane prepolymer [1'] | 100 | — |
| Blocked urethane prepolymer [2'] | — | 100 |
| Jeffermine T-403 | 19 | 18 |
| Calcium carbonate | 80 | 80 |
| Titan white | 5 | 5 |
| Carbon black | 1 | 1 |
| Aromatic petroleum naphtha (b.p. range: 100-200° C.) | 30 | 30 |

In the same manner as in Example 1 (2), each coating composition was applied onto an electro-deposit steel plate, followed by baking. The composition of Comparative Example 1 was cured, but the composition of Comparative Example 2 did not get to being cured.

Evaluation 1

Adhesion properties, coating properties and resistance to chipping of baked films thus obtained and storage stability of these compositions were tested according to the following methods. The evaluation results were as shown in Table 1.

[Testing Methods]

Adhesion properties: cross cuts of 1 mm square are made within 1 cm² area of the baked film of 200 micron meters on the electro-deposit steel plate of 100 mm×100 mm×0.8 mm, followed by carrying out peel test with cellophane tape and then taking a count of 1 mm square films remained adhered on the plate. The number of the remained films per the number of the initially crosscut films is shown in the table.

Coating properties: appearance (presence of blister, skim and the like) of coatings, after baking for 15 minutes at 120° C., is observed.

Resistance to chipping: the baked film of 200 micron meters on the electro-deposit steel plate of 100 mm×100 mm×0.8 mm is further coated with an intercoating composition (melamine-alkyd resin) of 30 micron meters dry film, followed by baking for 20 minutes at 140° C. Then an iron hexagon nut of the form specified in JIS B-1181, Type 3-M-4 was dropped from a height of 2 mm on the intercoated specimen, placed at an angle of 45° towards the direction of dropping. The total weight of the dropped nuts until flaw of the coated film reached the metal surface is shown in the table.

Storage stability: each coating composition is stored for 10 days at 40° C., and the ratio of viscosity increase (%) is shown in the table.

TABLE 1

| Example No. | Adhesion properties | Coating properties | Resistance to chipping (kg) | Storage stability |
|---|---|---|---|---|
| Example 1-1 | 100/100 | Good | 36 | 18 |
| Example 1-2 | 100/100 | Good | 31 | 10 |
| Example 1-3 | 100/100 | Good | 34 | 12 |

TABLE 1-continued

| Example No. | Adhesion properties | Coating properties | Resistance to chipping (kg) | Storage stability |
|---|---|---|---|---|
| Example 2 | 100/100 | Good | 40 | 10 |
| Comparative Example 1 | 100/100 | blister & skim were observed. | 17 | gelled within 3 days |

EXAMPLES 3 AND 4

(1) Preparation of Blocked Urethane Prepolymers (1) In the same manner as in Example 1 (1), 1218 parts of TDI, 2000 parts of PTMG (MW: 1000), 134 parts of trimethylol propane and 4222 parts of carbitol acetate were reacted for 3 hours at 70°–80° C. to obtain a urethane prepolymer (NCO content: 8.8%). Then, 870 parts of epsilon-caprolactam were added and reacted for 3 hours at 80°–90° C. to obtain a blocked urethane prepolymer [3].

(2) In the same manner as above, 1750 parts of MDI, 2000 parts of PTMG (MW: 1000), 134 parts of trimethylol propane and 4554 parts of carbitol acetate were reacted to obtain a urethane prepolymer. Then 670 parts of MEK oxime were added and reacted similarly to obtain another blocked urethane prepolymer [4].

(2) Coating Composition

Using these blocked urethane prepolymers, antichipping coating compositions were produced under the following formulations (parts).

|  | Example No. | |
|---|---|---|
|  | 3 | 4 |
| Blocked urethane prepolymer [3] | 100 | — |
| Blocked urethane prepolymer [4] | — | 100 |
| Ketimine of diethylene triamine and MIBK | 7 | 7 |
| Calcium carbonate | 80 | 80 |
| Titan white | 8 | 8 |
| Carbon black | 2 | 2 |
| Aromatic petroleum naphtha (b.p. range: 100–200° C.) | 100 | 100 |

In the same manner as in Example 1 (2), each coating composition was applied onto an electro-deposit steel plate, followed by baking and curing.

COMPARATIVE EXAMPLE 3

Example 3 was repeated except that 8 parts of ethylene diamine PO adduct (MW: 300) was used instead of ketimine of diethylene triamine and MIBK.

Evaluation 2

As to baked films thus obtained from compositions of Examples 3 and 4 and Comparative Example 3, coating properties and resistance to chipping were tested according to the above-mentioned methods, and resistance to hot water was tested observing appearance after dipping in hot water of 40° C. for 10 days. The results were as shown in Table 2.

TABLE 2

| Example No. | Coating properties | Resistance to chipping (kg) | Resistance to hot water |
|---|---|---|---|
| Example 3 | Good | 25 | Good |
| Example 4 | Good | 23 | Good |
| Comparative Example 3 | blister & skim were observed | 10 | blister was occurred |

EXAMPLE 5

(1) Preparation of Blocked Urethane Prepolymer

In the same manner as in Example 1 (1), 248 parts of TMXDI, 163 parts of polycaprolactone diol [PCL] (MW: 800), 27 parts of trimethylol propane and 360 parts of xylene were reacted for 3 hours at a temperature of 90°–95° C., followed by adding 0.03 parts of dibutyltin dilaurate and further reacting for 2 hours at the same temperature to obtain a urethane prepolymer (NCO content: 5.3%).

Then 57 parts of epsilon-caprolactam were added thereto and reacted for 3 hours at 90°–95° C., followed by adding gradually 43 parts of MEK oxime and then reacting for additional 1 hour to obtain a low viscosity liquid blocked urethane prepolymer [5].

(2) Plastisol Composition

A plastisol composition was prepared by kneading homogeneously according to the formulation (parts) written in Table 4.

The initial viscosity of the composition and the viscosity after stored for 14 days at 40° C. were as shown in Table 5.

Onto an electro-deposit steel plate (obtained by electro-deposition of cationic electro-deposition coating composition containing epoxy resin, followed by curing and baking to form anti-corrosive primer coating), the plastisol composition was applied with an airless spray coater so as to provide film of 0.5 mm thickness, followed by heat-treating for 20 minutes at 120° C. to obtain a coating film of high elasticity and excellent adhesion properties. Adhesion properties of the film showed substantially no change, after dipping in hot water of 40° C. for 10 days.

Tensile shear strength, as measured according to JIS K 6830 (Automobile, Test method of Sealing materials), using an cationic electro-deposit plate as the adherend (sol thickness: 1.0 mm, heat-treatment at 120° C. for 20 minutes), was 20.1 kg/cm$^2$.

EXAMPLES 6 and 7, AND COMPARATIVE EXAMPLES 4 AND 5

(1) Preparation of Blocked Urethane Prepolymers

Blocked urethane prepolymers [6], [7], [4'] and [5'] were prepared by repeating Example 5 (1), except varying amount of the blocking agents, or changing the kind of polyol or diisocyanate, as shown in Table 3. [In case of TDI, reaction was carried out at 75°–80° C.]

(2) Plastisol Compositions

By repeating Example 5 (2), plastisol compositions were prepared and properties were measured. The formulations (parts) and properties were as shown in Table 4 and Table 5, respectively.

TABLE 3

|  | Example No. | | | | |
|---|---|---|---|---|---|
|  | Examples | | | Comparative | |
|  | 5 | 6 | 7 | 4 | 5 |
| Polyol (MW) | PCL (800) | PCL (800) | PTMG (1000) | PCL (800) | PCL (800) |
| Diisocyanate | TMXDI | TMXDI | TMXDI | IPDI | TDI |
| NCO/OH ratio | 2/1 | 2/1 | 2/1 | 2/1 | 2/1 |
| MEK oxime, mole | 0.5 | 0.7 | 0.5 | 1.0 | 0 |
| Caprolactam, mole | 0.5 | 0.3 | 0.5 | 0 | 1.0 |

TABLE 3-continued

| | Example No. | | | | |
|---|---|---|---|---|---|
| | Examples | | | Comparative | |
| | 5 | 6 | 7 | 4 | 5 |
| Blocked prepolymer | [5] | [6] | [7] | [4'] | [5'] |

TABLE 4

| | Example No. | | | | | |
|---|---|---|---|---|---|---|
| | Examples | | | | Comparative | |
| | 5 | 6 | 7-1 | 7-2 | 4 | 5 |
| PSL-10 | 70 | 70 | 70 | 70 | 70 | 70 |
| PCH-12 | 30 | 30 | 30 | 30 | 30 | 30 |
| DOP | 110 | 110 | 110 | 110 | 110 | 110 |
| NCC-100 | 150 | 150 | 150 | 150 | 150 | 150 |
| Dibasic lead phosphite | 3 | 3 | 3 | 3 | 3 | 3 |
| Blocked prepolymer | [5] 6.7 | [6] 6.7 | [7] 6.7 | [7] 6.7 | [4'] 6.7 | [5'] 6.7 |
| L-2590 | 3.3 | 3.3 | 3.3 | 0 | 3.3 | 3.3 |
| L-2590-MIBK ketimine | 0 | 0 | 0 | 3.3 | 0 | 0 |

TABLE 5

| | | Example No. | | | | | |
|---|---|---|---|---|---|---|---|
| | | Examples | | | | Comparative | |
| | | 5 | 6 | 7-1 | 7-2 | 4 | 5 |
| Viscosity, ps/25° C. | Initial | 380 | 350 | 370 | 320 | 420 | 550 |
| | After stored | 480 | 440 | 450 | 380 | 530 | 720 |
| Adhesion properties | Initial | Good | Good | Good | Good | Bad | Bad |
| | After dip. | Good | Good | Good | Good | Bad | Bad |
| Tensile shear strength | kg/cm$^2$ (**) | 20.1 (CF) | 19.0 (CF) | 17.5 (CF) | 21.0 (CF) | 12.0 (AF) | 10.0 (AF) |

[Notes]
**CF: cohesive failure; AF: adhesive failure.

EXAMPLES 8-14, AND COMPARATIVE EXAMPLES 6-12

(1) Preparation of Isocyanurate or biuret-containing Blocked Polyisocyanates (1) Into the same reaction vessel as in Example 1 (1), 404 parts of Corronate EH, 196 parts of MEK oxime and 400 parts of DOP were charged and reacted for 1 hour at a temperature of 70° C. under an atmosphere of nitrogen to obtain an isocyanurate ring-containing blocked polyisocyanate [I]. It was confirmed with infrared spectrum that free NCO group (absorption at 2250 cm$^{-1}$) had disappeared.

(2) The above procedure (1) was repeated except that an isocyanurate derived from IPDI was used instead of Corronate EH to obtain an isocyanurate ring-containing blocked polyisocyanate [II].

(3) In the same manner as above (1), 419 parts of Corronate EH, 16 parts of n-butanol, 173 parts of MEK oxime and 392 parts of DOP were reacted for 2 hours at 70° C. to obtain an isocyanurate ring-containing blocked polyisocyanate [III].

(4) In the same manner as above (1), 398 parts of Duranate 24A-100, 202 parts of MEK oxime, 300 parts of DOP and 100 parts of methoxybutyl acetate were reacted to obtain a biuret group-containing blocked polyisocyanate [IV].

(2) Preparation of Blocked Urethane Prepolymer (1) By repeating Example 5 (1) except that blocking was carried out for 1 hour at a temperature of 70° C. using as the blocking agent 87 parts of MEK oxime alone instead of epsilon-caprolactam and MEK oxime, a low viscosity liquid blocked urethane prepolymer [8] was obtained.

(2) The above procedure 1) was repeated except that MDI was used instead of TMXDI to obtain an other blocked urethane prepolymer [9].

(3) Plastisol Compositions

In the same manner as in Example 5 (2), plastisol compositions were prepared and properties were measured, where adhesion properties were tested baking at 120° C. or 140° C. The formulations (parts) and properties were as shown in Tables 6-8.

TABLE 6

| | | Example No. | | | | |
|---|---|---|---|---|---|---|
| | | Examples | | | | Comparative |
| | | 8 | 9 | 10 | 11 | Example 6 |
| PSL-10 | | 70 | 70 | 70 | 70 | 70 |
| PCH-12 | | 30 | 30 | 30 | 30 | 30 |
| DOP | | 110 | 110 | 110 | 110 | 110 |
| NCC-100 | | 150 | 150 | 150 | 150 | 150 |
| Dibasic lead phosphite | | 3 | 3 | 3 | 3 | 3 |
| Blocked polyisocyanate | | [I] 3.7 | [I] 5.2 | [I] 3.7 | [II] 3.7 | 0 |
| Blocked prepolymer | | [8] 3.7 | [8] 2.2 | [8] 3.7 | [9] 3.7 | [8] 3.7 |
| L-2590 | | 3.1 | 3.1 | 0 | 3.1 | 3.1 |
| L-2590-MIBK ketimine | | 0 | 0 | 3.1 | 0 | 0 |
| Viscocity, ps/25° C. | Initial | 350 | 330 | 350 | 360 | 410 |
| | After stored | 420 | 400 | 410 | 480 | 700 |
| | Ratio of increase (%) | 120 | 121 | 117 | 133 | 171 |
| Adhesion properties*[1] | Initial | Good | Good | Good | Good | Good |
| | After dip. | Good | Good | Good | Good | Good |
| Tensile shear | kg/cm$^2$ | 20.8 | 18.5 | 20.1 | 19.3 | 21.6 |

TABLE 6-continued

| | | Example No. | | | | |
|---|---|---|---|---|---|---|
| | | Examples | | | | Comparative |
| | | 8 | 9 | 10 | 11 | Example 6 |
| strength | (**) | (CF) | (CF) | (CF) | (CF) | (CF) |

[Notes]
*[1] baked at 120° C.
**CF: cohesive failure.

TABLE 7

| | | Example No. | | | | | |
|---|---|---|---|---|---|---|---|
| | | Examples | | Comparative Examples | | | |
| | | 11 | 12 | 7 | 8 | 9 | 10 |
| PSL-10 | | 70 | 70 | 70 | 70 | 70 | 70 |
| PCH-12 | | 30 | 30 | 30 | 30 | 30 | 30 |
| DOP | | 110 | 110 | 110 | 110 | 110 | 110 |
| NCC-100 | | 150 | 150 | 150 | 150 | 150 | 150 |
| Dibasic lead phosphite | | 3 | 3 | 3 | 3 | 3 | 3 |
| Blocked polyisocyanate | | [I] 7.2 | [II] 7.2 | [I] 7.2 | [I] 36 | [II] 7.2 | [II] 36 |
| L-2590 | | 2.9 | 2.9 | 0 | 0 | 0 | 0 |
| Viscosity, pa/25° C. | Initial | 300 | 380 | 340 | 300 | 340 | 310 |
| | After stored | 380 | 450 | 400 | 430 | 380 | 450 |
| | Ratio of increase (%) | 127 | 118 | 118 | 143 | 112 | 145 |
| Adhesion properties*[2] | Initial | Good | Good | Bad | Good | Bad | Good |
| | After dip. | Good | Good | Bad | Bad | Bad | Bad |
| Tensile shear strength | kg/cm² (**) | 22.0 (CF) | 21.5 (CF) | 7.0 (AF) | 15.0 (CF) | 6.5 (AF) | 18.0 (CF) |

[Notes]
*[2] baked at 140° C.
**CF: cohesive failure, AF: adhesive failure.

TABLE 8

| | | Example No. | | | |
|---|---|---|---|---|---|
| | | Examples | | Comparative Examples | |
| | | 13 | 14 | 11 | 12 |
| PSL-10 | | 70 | 70 | 70 | 70 |
| PCH-12 | | 30 | 30 | 30 | 30 |
| DOP | | 110 | 110 | 110 | 110 |
| NCC-100 | | 150 | 150 | 150 | 150 |
| Dibasic lead phosphite | | 3 | 3 | 3 | 3 |
| Blocked polyisocyanate | | [IV] 7.2 | [IV] 3.6 | [IV] 7.2 | [IV] 3.6 |
| Blocked prepolymer | | 0 | [8] 3.6 | 0 | [8] 3.6 |
| L-2590 | | 6.5 | 5.0 | 0 | 0 |
| Viscosity, pa/25° C. | Initial | 300 | 320 | 310 | 315 |
| | After stored | 360 | 416 | 357 | 378 |
| | Ratio of increase (%) | 120 | 130 | 115 | 120 |
| Adhesion properties*[1] | Initial | Good | Good | Bad | Bad |
| | After dip. | Good | Good | Bad | Bad |
| Tensile shear strength | kg/cm² (**) | 21.8 (CF) | 21.0 (CF) | 10.0 (AF) | 9.5 (AF) |

[Notes]
*[1] baked at 120° C.
**CF: cohesive failure, AF: adhesive failure.

EXAMPLES 15-14, AND COMPARATIVE EXAMPLES 13-12

(1) Preparation of Isocyanurate-containing Blocked Polyisocyanate

Into the same reaction vessel as in Example 1 (1), 340 parts of corronate EH, 360 parts of DOP, 76 parts of stearyl alcohol and 135 parts of MEK oxime were charged and reacted for 3 hour at a temperature of 70° C. under an atmosphere of nitrogen to obtain an isocyanurate ring-containing blocked polyisocyanate [V]. It was confirmed with infrared spectrum that free NCO group (absorption at 2250 $cm^{-1}$) had disappeared.

(2) Preparation of Blocked Urethane Prepolymer

By repeating Example 8 (2) except using 92 parts of MEK oxime instead of 87 parts of MEK oxime, a low viscosity liquid blocked urethane prepolymer [10] was obtained.

(3) Plastisol Compositions

Plastisol compositions were prepared and properties were measured by repeating Example 5 (2) except that, in stead of the cationic electro-deposit steel plates, tinned steel plates were used as the substrate to be coated and as the adherend for testing tensile shear strength. The formulations (parts) and properties were as shown in Table 9.

TABLE 9

| | Example No. | | | | | |
|---|---|---|---|---|---|---|
| | Examples | | | | | Comparative |
| | 15 | 16 | 17 | 18 | 19 | 6 |
| PSL-10 | 70 | 70 | 70 | 70 | 70 | 70 |
| PCH-12 | 30 | 30 | 30 | 30 | 30 | 30 |
| DOP | 110 | 110 | 110 | 110 | 110 | 110 |
| NCC-100 | 150 | 150 | 150 | 150 | 150 | 150 |
| Dibasic lead phosphite | 3 | 3 | 3 | 3 | 3 | 3 |

TABLE 9-continued

|  |  | Example No. | | | | | |
| --- | --- | --- | --- | --- | --- | --- | --- |
|  |  | Examples | | | | | Comparative |
|  |  | 15 | 16 | 17 | 18 | 19 | 6 |
| Blocked polyisocyanate |  | [V] 5.4 | [V] 7.6 | [V] 3.2 | [V] 10.8 | 0 | 0 |
| Blocked prepolymer |  | [10] 5.4 | [10] 3.2 | [10] 7.6 | 0 | [10] 10.8 | 0 |
| KBM-603 |  | 1.8 | 1.8 | 1.8 | 1.8 | 1.8 | 1.8 |
| Viscosity, ps/25° C. | Initial | 300 | 380 | 280 | 420 | 250 | 280 |
|  | After stored | 480 | 665 | 390 | 1050 | 325 | 400 |
|  | Ratio of increase (%) | 60 | 75 | 39 | 150 | 30 | 43 |
| Adhesion properties | Initial | Good*1 | Good*1 | Good*1 | Good*1 | Good*2 | F*1 |
|  | After dip. | Good*1 | Good*1 | Good*1 | Good*1 | Good*1 | F*1 |
| Tensile shear strength | kg/cm² (**) | 15.0 (CF) | 17.5 (CF) | 14.5 (CF) | 15.0 (CF) | 18.5 (CF) | — (AF) |

[Notes]
*1baked at 120° C.; *2baked at 140° C.; F: foamed
**CF: cohesive failure, AF: adhesive failure.

What is claimed as new and desired to be secured by letters patent is:

1. A composition suitable for coating, which comprises:
   (I) a blocked urethane prepolymer, comprising (a) an NCO-terminated urethane prepolymer, blocked with (b) a blocking agent, said NCO-terminated urethane prepolymer being derived from a polyol and an organic polyisocyanate comprising $\alpha, \alpha, \alpha', \alpha'$-tetramethyl-xylylene diisocyanate; and
   (II) at least one curative selected from the class consisting of (1) polyoxyalkylene polyamines, (2) oxyalkylene ethers of monoor poly-amine free from amide groups, (3) ketimines of polyoxyalkylene polyamine, (4) ketimines of polyamide compound, (5) ketimines of mono- or polyalkylene polyamine, and (6) epoxy-modified products of any one of (1)–(5).

2. The composition of claim 1, wherein the blocking agent is at least one compound selected from the class consisting of oximes and lactams.

3. The composition of claim 1, wherein said polyisocyanate comprises at least 50% by weight of $\alpha, \alpha, \alpha', \alpha'$-tetramethyl-xylylene diisocyanate and 0–50% by weight of one or more other organic polyisocyanates selected from the class consisting of aliphatic polyisocyanates, cycloaliphatic polyisocyanates and aromatic polyisocyanates.

4. The composition of claim 1, wherein said polyol is at least one polyol selected from the class consisting of low molecular weight polyols having an equivalent weight of 30–300 and high molecular weight polyols having an equivalent weight of 300–3000.

5. The composition of claim 1, wherein said polyol has an average functionality of at least 2.01.

6. The composition of claim 1, wherein the equivalent ratio of said organic polyisocyanate to said polyol is between 1.3/1 and 3/1.

7. The composition of claim 1, wherein said NCO-terminated urethane prepolymer has a molecular weight of 500–10,000.

8. The composition of claim 1, wherein said blocked urethane prepolymer (I) and said curative (II) are present in such an amount providing the equivalent ratio of (I) to (II) between 1/0.1 and $\frac{1}{2}$.

9. The composition of claim 1, wherein said mono- or poly-amine constituting (II) (2) is selected from the group consisting of alkanol amines, aliphatic aromatic, araliphatic and alicyclic mono- and polyamines, and heterocyclic polyamines.

10. A composition suitable for coating resistant to chipping, which comprises:
   (I) a blocked urethane prepolymer, comprising (a) an NCO-terminated urethane prepolymer, blocked with (b) a blocking agent, said NCO-terminated urethane prepolymer being derived from a polyol and an organic polyisocyanate comprising $\alpha, \alpha, \alpha', \alpha'$-tetramethyl-xylylene diisocyanate; and
   (II) at least one ketimine of at least one amino compound selected from the class consisting of (1) mono-or poly-alkylene polyamines, mono- or poly-cycloalkylene polyamines and aromatic polyamines.

11. The composition of claim 10, wherein the blocking agent is at least one compound selected from the class consisting of oximes and lactams.

12. The composition of claim 10, wherein said polyol is at least one polyol selected from the class consisting of low molecular weight polyols having an equivalent weight of 30–300 and high molecular weight polyols having an equivalent weight of 300–3000, and said polyol has an average functionality of at least 2.01.

13. A plastisol composition, which comprises:
   at least one vinyl chloride polymer selected from the class consisting of polyvinylchlorides and copolymers of vinyl chloride with one or more monomers copolymerizable therewith;
   a plasticizer; and
   at least one adhesion promoter selected from the class consisting of
   (1) (I) a blocked polyisocyanate, comprising (a) an NCO-terminated urethane prepolymer, blocked with (b) a blocking agent, said NCO-terminated urethane prepolymer being derived from a polyol and an organic polyisocyanate comprising $\alpha, \alpha, \alpha', \alpha'$-tetramethyl-xylene diisocyanate, and (II) an active amino group-containing mono- or poly-amide compound;
   (2) (I) a blocked polyisocyanate comprising at least one blocked polyisocyanate selected from the class consisting of
      ($a_1$) isocyanurate ring-containing blocked polyisocyanate, derived from at least one polyisocyanate selected from the group consisting of aliphatic polyisocyanates and alicyclic polyisocyanates, and ($a_2$) biuret group-containing blocked polyisocyanate, and (II) an active amino group-containing mono- or poly-amide compound; and (3) (I) a blocked polyisocyanate comprising at least one blocked polyisocyanate selected from the class consisting of (a) isocyanurate ring or biuret group-containing blocked polyisocyanate and (b) blocked urethane prepolymers, and (II) an organic silane compound.

14. The composition of claim 13, which comprises 10–50% of, 10–50% of, 0.5–20% of, and 0–70% of one or more other additive, based on the weight of the composition.

15. The composition of claim 13, wherein the blocked polyisocyanate is one blocked with at least one compound selected from the class consisting of oximes and lactams.

16. The composition of claim 13, wherein the isocyanurate ring-containing blocked polyisocyanate ($a_1$) or (a) is a blocked product of an isocyanurate ring-containing polyisocyanate modified partly with at least one low molecular weight alcohol selected from the class consisting of mono-ols and polyols.

17. The composition of claim 13, wherein the adhesion promoter comprises (I) a blocked urethane prepolymer, comprising (a) an NCO-terminated urethane prepolymer, blocked with (b) a blocking agent, said NCO-terminated urethane prepolymer being derived from a polyol and an organic polyisocyanate comprising α, α, α', α'-tetramethyl-xylylene diisocyanate, and (II) an active amino group-containing mono- or poly-amide compound.

18. The composition of claim 13, wherein the adhesion promoter comprises (I) a blocked polyisocyanate comprising at least one blocked polyisocyanate selected from the class consisting of ($a_1$) isocyanurate ring-containing blocked polyisocyanate, derived from at least one polyisocyanate selected from the group consisting of aliphatic polyisocyanates and alicyclic polyisocyanates, and ($a_2$) biuret group-containing blocked polyisocyanate, and (II) an active amino group-containing mono- or poly-amide compound.

19. The composition of claim 18, wherein said blocked polyisocyanate (I) further comprises (b) a blocked urethane prepolymer.

20. The composition of claim 13, wherein the adhesion promoter comprises (I) a blocked polyisocyanate comprising at least one blocked polyisocyanate selected from the class consisting of (a) isocyanurate ring-containing blocked polyisocyanate and (b) blocked urethane prepolymers, and (II) an organic silane compound.

21. A coated metal article, having improved resistance to chipping, which comprises a cured coating produced from the composition of claim 1, coated on metallic surface selected from untreated metallic surface, chemically treated metallic surface and electrodeposit metallic surface, with or without top coating or intercoating and top coating.

22. A coated metal article, having improved resistance to chipping, which comprises a cured coating produced from the composition of claim 10, coated on metallic surface selected from untreated metallic surface, chemically treated metallic surface and electrodeposit metallic surface, with or without top coating or intercoating and top coating.

23. A coated metal article, having improved resistance to chipping, which comprises a cured coating produced from the composition of claim 13, coated on metallic surface selected from untreated metallic surface, chemically treated metallic surface and electrodeposit metallic surface, with or without top coating or intercoating and top coating.

* * * * *

UNITED STATES PATENT AND TRADEMARK OFFICE
CERTIFICATE OF CORRECTION

PATENT NO.  : 5,130,402

DATED       : July 14, 1992

INVENTOR(S) : Hajime Akiyama et al.

It is certified that error appears in the above-identified patent and that said Letters Patent is hereby corrected as shown below:

On the Title page, item [30], under Foreign Application Priority Data
The second Foreign Application Priority Data is incorrect, should be, --Sept. 22, 1988  [JP]  Japan......................63-238318--.

Signed and Sealed this

Seventh Day of September, 1993

Attest:

BRUCE LEHMAN

Attesting Officer

Commissioner of Patents and Trademarks